United States Patent
Georgopoulos et al.

(10) Patent No.: US 11,416,581 B2
(45) Date of Patent: Aug. 16, 2022

(54) MULTIPLICATION OF A MATRIX WITH AN INPUT VECTOR

(71) Applicant: International Business Machines Corporation, Armonk, NY (US)

(72) Inventors: Leonidas Georgopoulos, Zurich (CH); Peter Staar, Wadenswil (CH); Michele Dolfi, Zurich (CH); Christoph Auer, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 16/812,540

(22) Filed: Mar. 9, 2020

(65) Prior Publication Data
US 2021/0279299 A1    Sep. 9, 2021

(51) Int. Cl.
*G06F 12/08*    (2016.01)
*G06F 17/16*    (2006.01)
*G06F 12/0871*  (2016.01)
*G06F 11/34*    (2006.01)

(52) U.S. Cl.
CPC .......... *G06F 17/16* (2013.01); *G06F 11/3485* (2013.01); *G06F 12/0871* (2013.01)

(58) Field of Classification Search
CPC ................ G06F 17/16; G06F 11/3485; G06F 12/0871
USPC ....................................................... 708/607
See application file for complete search history.

(56) References Cited

U.S. PATENT DOCUMENTS

| | | | | |
|---|---|---|---|---|
| 8,180,964 | B1* | 5/2012 | Koh | G06F 11/3442 711/118 |
| 8,595,439 | B1* | 11/2013 | Koh | G06F 8/30 711/123 |
| 2018/0025288 | A1* | 1/2018 | Piche | G06F 30/23 706/46 |
| 2018/0121388 | A1 | 5/2018 | Rennich | |
| 2018/0189032 | A1 | 7/2018 | Nurvitadhi | |
| 2019/0311245 | A1* | 10/2019 | Zhang | G06N 3/105 |
| 2020/0310985 | A1* | 10/2020 | Li | G06F 12/0871 |
| 2020/0401440 | A1* | 12/2020 | Sankaran | G06F 9/3863 |

(Continued)

OTHER PUBLICATIONS

Alshahrani et al., "Selection of Top-K Influential Users Based on Radius-Neighborhood Degree, Multi-Hops Distance and Selection Threshold", J Big Data (2018) 5:28, 21 pps., <https://doi.org/10.1186/s40537-018-0137-4>.

(Continued)

*Primary Examiner* — Than Nguyen
(74) *Attorney, Agent, or Firm* — Jared L. Montanaro

(57) ABSTRACT

Aspects of the present invention disclose a method, computer program product, and system for performing a multiplication of a matrix with an input vector. The method includes one or more processors subdividing a matrix into logical segments, the matrix being given in a sparse-matrix data format. The method further includes one or more processors obtaining one or more test vectors. The method further includes one or more processors performing an optimization cycle. In an additional aspect, performing the optimization cycle further comprises, for each of the test vectors, one or more processors, performing a cache performance test.

20 Claims, 5 Drawing Sheets

(56) References Cited

U.S. PATENT DOCUMENTS

2021/0334648 A1* 10/2021 Li ....................... G06N 3/0454

OTHER PUBLICATIONS

Chen et al., "Optimizing Sparse Matrix-Vector Multiplication on Emerging Many-Core Architectures", arXiv:1805.11938v1 [cs.MS], May 29, 2018, 9 pps.
Nasir et al., "Fully Dynamic Algorithm for Top-k Densest Subgraphs", CIKM'17, Nov. 6-10, 2017, Singapore, 10 pps., <https://doi.org/10.1145/3132847.3132966>.
Abubaker, et al., "Spatiotemporal Graph and Hypergraph Partitioning Models for Sparse Matrix-Vector Multiplication an Many-Core Architectures", IEEE Transactions on Parallel and Distributed Systems: 1-1, Aug. 10, 2018,15 pgs., <http://hdl.handle.net/10754/628848>.

\* cited by examiner

I = [ 0 0 0    1 1 1    2 2    3 3 3 3 ]

J = [ 0 2 3    1 3 0    2 3    0 1 2 3 ]

S = [ 1 3 4    1 2 3    3 4    1 2 3 4 ]

Cache = {[ 0 1 2 ], [ 1 2 3 ]}

| 400 | Start: | Cache sequence | | | | Hit ratio | Average | | | | | | | | 412 | Aggregated Cache Performances: | | |
|---|---|---|---|---|---|---|---|---|---|---|---|---|---|---|---|---|---|---|
| | A | [012] | [123] | | | 0.75 | | | | | | | | | | A | B | C |
| | B | [012] | [123] | [012] | [123] | 0.25 | 0.58 | | | | | | | | | 0.75 | 0.25 | 0.75 |
| | C | [012] | [123] | | | 0.75 | | | | | | | | | | | | |
| 402 | Segment | A | A | A | A | B | B | B | B | C | C | C | C | | | A | B | |
| | i | 0 | 0 | 1 | 1 | 1 | 1 | 2 | 2 | 3 | 3 | 3 | 3 | | | 0.75 | 0.25 | |
| | j | 0 | 2 | 3 | 1 | 3 | 0 | 2 | 3 | 0 | 1 | 2 | 3 | | | | | |
| | s | 1 | 3 | 4 | 1 | 2 | 3 | 3 | 4 | 1 | 2 | 3 | 4 | | | | | |
| | Weight | 0.75 | 0.75 | 0.75 | 0.75 | 0.25 | 0.25 | 0.25 | 0.25 | 0.75 | 0.75 | 0.75 | 0.75 | | | | | |
| 404 | Segment | A | A | A | A | B | B | B | B | C | C | C | C | | | A | C | B |
| | i | 0 | 0 | 1 | 1 | 1 | 1 | 2 | 2 | 3 | 3 | 3 | 3 | | | 0.75 | 0.75 | 0.25 |
| | j | 0 | 3 | 3 | 1 | 3 | 0 | 2 | 3 | 0 | 1 | 2 | 3 | | | | | |
| | s | 1 | 4 | 4 | 1 | 2 | 3 | 3 | 4 | 1 | 2 | 3 | 4 | | | | | |
| | Weight | 0.75 | 0.75 | 0.75 | 0.75 | 0.25 | 0.25 | 0.25 | 0.25 | 0.75 | 0.75 | 0.75 | 0.75 | | | | | |
| 406 | Segment | A | A | A | A | C | C | C | C | B | B | B | B | | | A | C | B |
| | i | 0 | 0 | 1 | 1 | 3 | 3 | 3 | 3 | 1 | 1 | 2 | 2 | | | 0.625 | 0.75 | 0.375 |
| | j | 0 | 3 | 3 | 1 | 3 | 2 | 2 | 3 | 1 | 0 | 2 | 3 | | | | | |
| | s | 1 | 4 | 4 | 1 | 4 | 3 | 3 | 4 | 1 | 3 | 3 | 4 | | | | | |
| | Weight | 0.75 | 0.75 | 0.75 | 0.75 | 0.75 | 0.75 | 0.75 | 0.75 | 0.25 | 0.25 | 0.25 | 0.25 | | | | | |
| 408 | Segment | A | A | A | A | C | C | C | C | B | B | B | B | | | A | C | B |
| | i | 0 | 0 | 1 | 1 | 3 | 3 | 3 | 3 | 1 | 1 | 2 | 2 | | | 0.625 | 0.625 | 0.5 |
| | j | 0 | 3 | 3 | 1 | 3 | 2 | 3 | 3 | 1 | 0 | 2 | 3 | | | | | |
| | s | 1 | 4 | 4 | 1 | 4 | 3 | 4 | 4 | 1 | 3 | 3 | 4 | | | | | |
| | Weight | 0.75 | 0.75 | 0.75 | 0.75 | 0.75 | 0.75 | 0.75 | 0.75 | 0.25 | 0.25 | 0.25 | 0.25 | | | | | |
| 410 | Result: | Cache sequence | | | | Hit ratio | Average | | | | | | | | | | | |
| | A | [012] | [123] | | | 0.75 | | | | | | | | | | | | |
| | B | [012] | | | | 1 | 0.83 | | | | | | | | | | | |
| | C | [012] | [123] | | | 0.75 | | | | | | | | | | | | |

Fig. 4

MULTIPLICATION OF A MATRIX WITH AN INPUT VECTOR

BACKGROUND OF THE INVENTION

The present invention relates generally to the field of data analysis, and more particularly to structuring input data.

The multiplication of a matrix with a vector is a basic operation in many modern computing applications that is known to be slow even if the input matrix is sparse. An exemplary application which frequently produces sparse matrices is the analysis of graph data structures such as social graphs or knowledge graphs. Several data structures such as the coordinate list (COO) and the compressed-sparse-row format (CSR) are known today for storing the non-zero elements of a matrix to enable a resource-efficient processing of sparse matrices. On the other hand, the vector to be multiplied can be generally regarded as dense. Sparse matrix-vector multiplication (SpMV) is a widely used computational kernel existing in many scientific applications. The input matrix is sparse, while the input vector and the output vector are dense.

SUMMARY

Aspects of the present invention disclose a method, computer program product, and system for performing a multiplication of a matrix with an input vector. The method includes one or more processors subdividing a matrix into logical segments, the matrix being given in a sparse-matrix data format. The method further includes one or more processors obtaining one or more test vectors. The method further includes one or more processors performing an optimization cycle. In an additional aspect, performing the optimization cycle further comprises, for each of the test vectors, one or more processors, performing a cache performance test. In a further aspect, performing the cache performance test further comprises, for each of the logical segments, one or more processors performing a test multiplication by providing a respective logical segment and a respective test vector to an input of a matrix-vector multiplication algorithm. In addition, performing the cache performance test further comprises, during the test multiplication of each segment, one or more processors determining a cache performance value of a cache of a processor performing the test multiplication.

In another aspect, the optimization cycle further comprises, for each of the logical segments: one or more processors determining an aggregated cache performance from the cache performance values determined for the respective logical segment; and one or more processors assigning a weight to each element of the matrix within the respective logical segment, the weight comprising the aggregated cache performance of the segment.

BRIEF DESCRIPTION OF THE DRAWINGS

FIG. 4 illustrates effects of optimization cycle operations carried out on the matrix representation of FIG. 3B, in accordance with an embodiment of the present invention.

DETAILED DESCRIPTION

Figure 1:
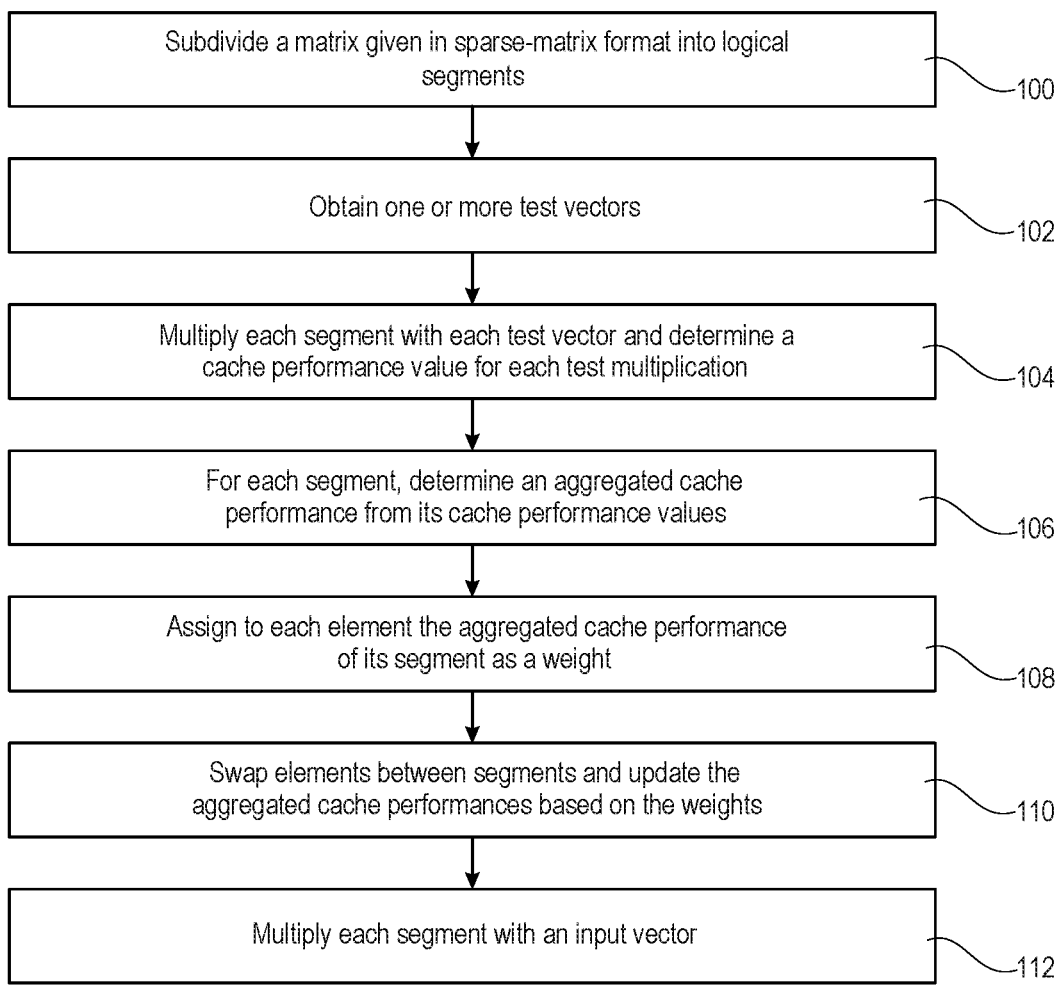
FIG. 1 depicts a flow diagram representing a method for performing a multiplication of a matrix with an input vector, in accordance with an embodiment of the present invention.

Among many other traits, the ever-growing volume of data reflects in growing dimensions of matrices to be processed (e.g., for analyzing such data). Embodiments of the present invention recognize that even sparse matrices may easily exceed the capacity of a processor cache involved in a matrix-vector multiplication. As a consequence, an increasing number of memory accesses may be necessary for updating the cache. Therefore, embodiments of the present invention recognize that an approach for reducing the number of required memory accesses for performing a matrix-vector multiplication is desirable.

Embodiments of the present invention provide an approach for performing a matrix-vector multiplication for a matrix that is given in a sparse-matrix data format. In an overview, the method can be summarized as comprising the three parts of inspection, optimization, and execution. The inspection may include observing the sequence of memory access patterns by executing the multiplication with a series of test vectors while recording indicator metrics for the cache performance. The optimization part may include reordering the matrix, such that the probability of cache-miss events decreases. Eventually, embodiments of the present invention can perform the desired multiplication of the reordered matrix by an unknown input vector by running a matrix-vector multiplication algorithm, such as auto-tuned sparse matrix-vector multiplication.

A sparse-matrix data format is defined herein as any data structure that allows for storing only the nonzero elements of a given matrix M having m lines and n columns. Without restriction of generality, the input vector v is assumed herein to be a column vector, so each coordinate of v is uniquely assigned to one column of M that contains the sole elements by which said input coordinate is multiplied during the elementary multiplications performed in the course of the matrix-vector multiplication. Unless noted to the contrary, the term "number of (matrix) elements" refers herein only to the nonzero elements that are stored in the sparse-matrix data format, and not to the total number of matrix elements (m×n) including the zero entries. A sparse-matrix data structure storing entries of a particular matrix is referred to herein as a sparse-matrix representation of that matrix.

Embodiments of the present invention recognize that the existence of a sparse-matrix representation of any given matrix does not necessarily mean that the matrix thus stored is a sparse matrix. An exemplary list of sparse-matrix data formats includes, without limitation, dictionary of keys (DOK), list of lists (LIL), coordinate list (COO), compressed sparse row (CSR) or compressed row storage (CRS) or Yale format, modified CRS format (MRS), compressed sparse column (CSC) or compressed column storage (CCS) or Harwell-Boeing format, compressed diagonal storage (CDS), band matrix storage (BND) or LAPACK format, shifted diagonal format (JDS), and skyline storage (SKS).

The method for performing a multiplication of a matrix with an input vector comprises subdividing the matrix into logical segments. A logical segment or, in short, a segment of a given matrix is understood herein as an arbitrary grouping of matrix elements of that matrix that is neither related to the data stored by the grouped elements nor to the pattern of addresses by which these elements are stored in a given memory. Likewise, a matrix element of a given matrix may be referred to in short as an element. Furthermore, any vector described herein is understood as a coordinate vector, i.e., an ordered list of vector elements that are referred to as coordinates. In order to enable arithmetic computations, matrix elements as well as vector coordinates comprise numerical data.

Computer-implemented sparse-matrix-dense-vector multiplication (SpMV) is particularly difficult in the general case. Embodiments of the present invention recognize that a major bottleneck of the SpMV operation is accessing the vector V and matrix M. The memory access is usually dominated by the structure of the non-zero elements in the matrix which, in graph analysis, correspond to edges in the graph. In the general case, the sparse-matrix data structure stores the non-zero matrix elements in an unordered manner. In this case, the computation may slow down due to frequent and repeated updates of the processor cache with matrix elements from computer memory.

Many possibilities can be identified for setting the number of segments. In an example, embodiments of the present invention recognize benefits in calculating the number of elements per segment such that all elements of a single segment may be stored within the processor cache with a high probability. A simpler choice may be to define a constant number of segments, a constant number of elements per segment, or a suitable (truncated or rounded) mathematical function, such as the square root or logarithm, of the number of elements.

The method also comprises obtaining one or more test vectors. Obtaining a test vector means herein that one or more coordinates of any test vector may be determined randomly or deterministically, may be loaded from a computer-readable storage medium and/or may be received via network communication or through an input device. If more than one test vector is obtained, embodiments of the present invention can exclude any obtained vectors that are duplicates of vectors that were previously obtained for the same cache performance test from consideration as part of the plurality of test vectors.

The method also comprises multiplying each segment of the matrix to the test vector(s) and to the input vector. The caching behavior of the specific combination of matrix and processor may be tested by multiplication of the matrix with one or more different test vectors. The number of test vectors may be selected large enough to average out the influence of the particular structure of each test vector. Hence, the variety of the test vectors may enable to establish memory access statistics that may reflect the characteristics of said matrix-processor combination and may be independent of the characteristics of the input vector.

Embodiments of the present invention can choose test vectors according to various principles. For instance, the coordinates of the test vectors may be set to random numbers, which may yield testing conditions that resemble unpredictable input vectors more closely than other approaches. A more systematic way may be to set the number of test vectors in a first set to the dimension of the matrix and set all coordinates to zero except one such that each coordinate is nonzero in a single test vector (i.e., each test vector is nonzero in a single coordinate and all test vectors are mutually orthogonal). Accordingly, embodiments of the present invention can assess the effect of each coordinate on the cache performance. Alternatively or additionally, a second set having the same number of test vectors may be set to nonzero values in all coordinates except for one coordinate such that each coordinate is set to zero in a single test vector of the second set (i.e., each test vector is zero in a single coordinate and all test vectors are mutually orthogonal). Accordingly, embodiments of the present invention can efficiently assess coupling effects of the non-zero coordinates on the cache performance.

The process of multiplying each segment of the matrix may be understood as being mathematically equivalent to the multiplication of all segments (i.e., the full matrix), with the respective vector. Thus, said multiplication of each segment with the respective vector may yield an output vector which is the product of the matrix and the respective vector. However, the matrix-vector multiplication algorithm used for performing the respective multiplication is required to support performing the multiplication in the order imposed by the segments, i.e., the multiplication of all elements within the same segment by the respective matching vector coordinates is supposed to be finished before the elements of the next segment are processed (notwithstanding parallel execution of the multiplication algorithm on multiple processors or processing cores).

Accordingly, without any further requirements regarding the order in which the elements are assigned to the segments, after completing the multiplication for all elements of a given segment, not necessarily all calculation steps needed to obtain a given coordinate of the output vector may have been performed yet. The matrix-vector multiplication algorithm may take the performed calculation steps into account and may be open, at a given point in time, for any calculation steps that may be missing for each coordinate of the output vector. However, as all elements of the matrix are assigned to one of the segments, all necessary elementary multiplications may be completed if the segmented multiplication has been completed for all segments, and hence the aforementioned mathematical equivalence may come about.

The method also comprises, during the test multiplication of each segment, determining a cache performance value of a cache of a processor performing the test multiplication. Embodiments of the present invention can implement method on any architecture where processor introspection mechanisms are available. The term "processor introspection mechanism" refers to any processor instructions and associated higher-level programming language application programming interfaces (APIs) that permit to read state information and statistics about the processor operation and functionality at a given point in time and/or corresponding change between two or more subsequent points in time. A processor introspection mechanism can include, without limitation, mechanisms for enabling processor introspection functionality and/or for enabling, reading, and resetting counters or other sources of processor introspection information. Without limitation, such introspective information may include, each referring to a cache activity related to the multiplication of a single segment, one or more of a cache access count, a cache hit count, a cache miss count, and a time information such as an average access time (AAT).

Without limitation, embodiments of the present invention can determine a cache performance value for a given segment by reading out raw data related to the cache of a processor involved in the respective multiplication (for instance, one or more counter values or values from other suitable information sources), optionally performing converting and/or aggregating calculations on the raw data, and storing the result in a statistics dataset. Such statistics may enable a quantitative characterization of the performance of any processor cache involved in the multiplication of each segment with each test vector. Further, each multiplication may involve one or more processors and/or one or more processor caches and that any aggregation performed on the raw introspection data to obtain a single cache performance value for each segment may include combining the raw data over time and/or processors and/or cache memories involved.

For each segment, embodiments of the present invention can the cache performance values for each test vector and then aggregate over all test vectors to obtain a single, aggregated cache performance for each segment that may serve as a basis for the further course of the optimization cycle. For instance, the aggregated cache performances may optionally be used to assess whether an optimization is necessary at all, and if so, to control the extent of optimization. Further, the metric used for quantifying cache performance (i.e., the single cache performance values as well as the aggregated cache performances) may likewise be a positive or increasing measure of performance (e.g., a cache hit rate comprising the ratio of the number of cache hits to the total number of accesses) or a negative or decreasing measure of performance (e.g., a cache miss rate comprising the ratio of the number of cache misses to the total number of accesses).

The actual optimization may start with assigning the aggregated cache performance of each segment as a weight to its elements. The aggregated cache performance of each segment may be used to select a pair of segments between which elements are to be interchanged and may optionally be used further to determine the number of elements to be interchanged between the selected pair of segments. Then, embodiments of the present invention can interchange one or more pairs of elements ("element swap"), where the elements of each pair are assigned to different ones of the selected segments. That is, if two segments called "C" and "F" have been selected for performing an element swap of an element "x" that is assigned to segment C with an element "y" assigned to segment F, the element swap yields a reassignment of element x to segment F and element y to segment C.

Criteria for selecting two segments for swapping may not necessarily be based on their aggregated cache performances. For instance, the segments can be randomly selected. However, a selection of segments for swapping based on their aggregated cache performances may allow for a more systematic balancing of the aggregated cache performances by interchanging the elements.

A single element swap of one or more pairs of elements may conclude by updating the aggregated cache performance of each selected segment based on the weights. The updated aggregated cache performance is different from the original determination of the aggregated cache performances, which was based on the statistics measured during the test multiplications. After the element swap, the weights of each selected segment's elements, whether subject to swapping or not, are combined (e.g., as a sum or an average) to yield an updated aggregated cache performance for each segment, which may enable a preliminary estimation of the effect of each element swap.

The element swap may be performed multiple times with different segments selected for swapping each time so that an extended redistribution of elements may be affected. In a non-limiting example, the number of swapped elements is proportional to the difference between the aggregated cache performances between the selected pair of segments. Repeated swapping of elements should suppress infeasible operations such as selecting the same pair of segments multiple times for swapping, or swapping the same element more than once, or swapping more than half of the elements between a given selected pair of segments as this may increase the difference between their aggregated cache performances compared to an exchange of half of the elements. Embodiments of the present invention can update the aggregated cache performances after each element swap between a single pair of segments, or after completion of element swapping for the final selected pair of segments. Likewise, the element swap of a subsequently selected pair of elements may be based on a set of aggregated cache performances that has been updated after the previous element swap, or on the set of aggregated cache performances that was originally determined based on the test multiplications.

Furthermore, it may be unnecessary to perform element swapping for all combinations of segments. Rather, various approaches may be taken for limiting the number of swap-partnering segments (e.g., to half the total number of segments). In a non-limiting example, the segments may be sorted by respective aggregated cache performance and considered as one half of segments with greater values of the aggregated cache performance and another half of segments with lower values of the aggregated cache performance. In this example, a first criterion may be applied where each pair of selected segments comprises one segment from the "greater half" and one segment from the "lower half," and a second criterion may be applied that exempts all pairs of segments from swapping whose aggregated cache performance difference is below a predefined threshold.

Embodiments of the present invention may utilize the observation that several applications feature a matrix that is known and constant for a longer period of time, which may be the case for applications such as graph analysis where the matrix represents a data structure that changes slowly enough that a large number of matrix-vector multiplications may be performed with the same matrix before the represented data structure changes. Therefore, it may be feasible to take the effort of optimizing the memory access during multiplications of a given matrix.

Embodiments of the invention may have the advantage of reducing the number of memory accesses for reloading parts of the matrix and/or the input vector into the processor cache. Embodiments of the present invention can achieve such advantages through the following effects: First, the memory access behavior of the matrix may be assessed by means of the test multiplications of the matrix to a series of test vectors. The test multiplications may be balanced between testing a larger number of test vectors to obtain a more diverse spectrum of multiplication conditions, i.e., to make the cache statistics less dependent on the content of the vectors by which the matrix is to be multiplied, and keeping the number of test vectors as small as possible to perform the optimization cycle(s) with a more efficient use of computing infrastructure.

Second, said reduction of memory accesses may be achieved by means of the element swap. Each time an element of the matrix or a coordinate of the input or test vector is not found ("cache miss"), the missed element or coordinate has to be loaded into the cache from memory which can be assumed to have a substantially higher access time than the processor cache. The more often an element or coordinate is found in the cache ("cache hit"), the more often the element or coordinate was stored in cache together with elements and/or coordinates that were accessed at about the same time of the multiplication routine. On the other hand, the more often an element or coordinate is missed from the cache, the closer that access of the element or coordinate may be related to that of the elements and/or coordinates that were stored in the cache at about the same time of the multiplication routine when the missing element or coordinate was not found there. Hence, embodiments of the present invention recognize the benefits of having the elements stored together in cache at a given point of time that have a correlated access during matrix-vector multiplication.

This condition may be approximated by the interchange of elements between different segments, in connection with the requirement that the interchange should be performed such that the difference between the aggregated cache performances of the selected segments, when calculated for each selected segment after the interchange based on the weights of the elements within the segment, has a smaller absolute value than the difference between the aggregated cache performances of the selected segments before the interchange. This may be achieved by performing the update of the aggregated cache performance for the two selected segments after each element swap. In this way, it may be possible to keep track of the current aggregated cache performance for each segment after each element swap so that the effect of a further element interchange with another segment may be planned before each swap.

However, it may alternatively be possible to meet this condition without frequently updating the aggregated cache performances, but by knowing that a segment with a larger aggregated cache performance and a segment with a smaller aggregated cache performance may be equalized in terms of respective aggregated cache performance by interchanging up to half of the elements. In this way, knowing that before the first element swap of a given segment, all elements in that segment have the same weight, namely that which was determined as a result of the test multiplications before, it may be possible to plan the interchange of elements between multiple segments by numbers of interchanged elements before the first element swap, then perform the element swaps according to the interchange plan, and update the aggregated cache performances for all segments after the last swap according to the plan. Accordingly, embodiments of the present invention can reduce the total number of calculations needed for updating the aggregated cache performances.

Various embodiments of the present invention can perform the one or more element swaps within each optimization cycle to equalize the aggregated cache performances of the segments. However, the updated aggregated cache performances after completion of a full series of element swaps within the same run of the optimization cycle does not necessarily reflect the actual cache performance of the updated segments after the swaps because of the assumption that the measured aggregated cache performance for a given segment is equal for each of its elements.

Setting the weight of each element within a segment to the statistical value found for the segment as a whole may simulate the ideal case that the combination of the elements into one segment has no effect on the cache performance during the multiplication. The subsequent swapping of matrix elements between different segments under equalization of the updated aggregated cache performances may thus be understood as an attempt to approximate this ideal combination. Therefore, after completion of the optimization cycle, one may have the option to either perform the multiplication of the updated segments with the input vector (if the approximation of the ideal combination appears good at a given point in time), or to repeat the optimization cycle, starting with a new series of test multiplications for assessing the actual cache performance of the updated segments.

It must be noted that the method may offer two preferable points for exiting the optimization cycle: The earlier possibility may be to break the cycle before the assignment of the measured aggregated cache performances to each segment's elements. The earlier possibility may be beneficial if the deviation of the measured aggregated cache performances from the aggregated cache performances of a preceding optimization cycle is small, or if the measured aggregated cache performances are already within the predetermined tolerance interval so an element swap may yield no substantial improvement. The later possibility for breaking the optimization cycle, or not starting another iteration, may be after the completion of the element swaps, which may be the case if, for instance, a predetermined maximum number of iterations has been reached, of if an average or minimum of the updated aggregated cache performances is above a predetermined threshold value.

In total, embodiments of the invention may have the advantage that the equilibrated aggregated cache performances of the segments may reflect the result that matrix elements and/or vector coordinates that are frequently accessed in a correlated manner may be grouped together within the updated segments with a higher probability than before the swapping of elements. This content-driven cache performance optimization may be distinct from other, hardware-centric approaches.

It is emphasized that embodiments of the invention may allow to tune a known matrix to an unknown machine architecture, even at runtime (i.e., when the input vector has already been received on the unknown machine) by recording the memory access patterns as they happen. Embodiments were developed based on the insight that the detailed order in which matrix elements and/or vector coordinates are stored in cache may be unique for a certain machine. This varying behavior may be uncovered by recording the memory access patterns before performing the actual multiplication. In particular, the matrix optimization may be independent of any received input vector so it may likewise be completed off-line (i.e., before receiving the input vector for which multiplication is desired). Accordingly, the present method can provide benefits for distributed computing approaches, such as offering optimized matrix multiplication as a cloud service. The multiplication algorithm may operate on the specific memory access patterns by having them identified beforehand for the specific combination of machine and matrix.

The method may be especially efficient in applications where the number of input vectors that are expected to be multiplied with the matrix is large against the number of test vectors. For instance, the matrix may represent a graph which changes infrequently so that the number of input vectors to be multiplied between two subsequent changes of the graph regularly reaches an order of $10^5$, while the number of test vectors in the example is in the order $10^2$. If the graph is changed, then the matrix can be updated, and the multiplication test may be performed once for the updated matrix to be prepared for the next set of input vectors.

According to an embodiment, the assignment of a weight to each element of the matrix and the element swap are performed only if an optimization criterion is not fulfilled. The optimization criterion can include a logical expression relating to the aggregated cache performance of at least one of the segments. The check of the optimization criterion may be placed at the earlier breaking point discussed above (i.e., after completion of the test multiplication(s)).

Many possibilities may be identified for formulating the logical expression based on the aggregated cache performance of at least one of the segments. Without limitation, the optimization criterion may relate to a change between subsequent iterations. In a more specific example, the change of the measured aggregated hit ratio of each segment or of the sum or an average of the hit ratio over all segments is small (e.g., below a predetermined threshold value) compared to the respective value of the preceding series of test multiplications. Alternatively, or additionally, without limitation, the difference of the measured aggregated cache performances of a current iteration to the updated, weight-based aggregated cache performances of a preceding iteration may be small. Criteria relating to small changes between subsequent iterations may ensure that the optimization potential of the matrix is exploited as far as possible.

In another aspect, the optimization criterion does not necessarily have to relate to iterations, which may enable skipping the element swap even within a single run of the optimization cycle if the optimization potential is low. For instance, the smallest aggregated cache performance or the sum or an average aggregated cache performance over all segments, as determined during the latest series of test multiplications, may equal or exceed a predetermined threshold value; and/or the difference between the measured aggregated cache performances may already be within the predefined tolerance interval. Such absolute optimization criteria may ensure a minimum of computational efficiency for the multiplication of the matrix with the input vector.

According to an embodiment, the method further comprises repeating the optimization cycle if an iteration criterion is fulfilled, the iteration criterion being checked after at least one of the determination of the aggregated cache performance for each segment, and the update of the aggregated cache performance for each segment, the iteration criterion comprising a logical expression relating to at least one of the aggregated cache performance of one or more of the segments, and a number of passed iterations.

Said placement of the iteration criterion may correspond to the earlier or the later breaking point discussed above. A repetition of the optimization cycle, which is also referred to as an iteration, may yield a higher aggregated cache performance for one or more segments as the grouping of elements with a correlated access in a common segment may become more concentrated with each iteration up to a certain saturation or equilibrium where further element swaps may yield a mere insignificant change of the aggregated cache performances. The approach of said saturation or equilibrium by iterations of the optimization cycle is herein referred to as convergence. Iterating the optimization cycle may also allow for reducing the number of test vectors and/or the number of element pairs to be interchanged per element swap, as the effect of a small number of interchanges may be assessed more quickly, and systematic errors in statistics that are based on a smaller number of test multiplications may be corrected earlier by the next element swap, so there may be a faster convergence towards a balanced distribution.

For example, an additional or alternative iteration criterion relating to the number of passed iterations may allow for checking whether a predefined maximum number of iterations is reached. By avoiding that the number of optimization cycle iterations becomes large, this may enable a more resource-efficient optimization.

According to an embodiment, the cache performance value comprises or is derived from one or more of a miscount of the cache, a hit count of the cache, an access count of the cache, and a time taken for performing the multiplication of the segment. Out of the larger group of general quantities that may allow for assessing the cache performance and the effect of the optimization on the cache performance, the list may provide some especially useful and efficient metrics for assessing the cache performance, as far as one or more of these metrics are available on a given computing system in real-time. For instance, one may use the miscount and the access count to calculate the ratio of misses to accesses (also referred to as "(cache) miss ratio" herein), or use the hit count and the access count to calculate the ratio of hits to accesses (also referred to as "(cache) hit ratio" herein). However, embodiments of the present invention can also assess the cache performance more indirectly by recording the total access time taken for performing the elementary multiplications for all elements within one segment.

Further, the metric used for quantifying cache performance, (i.e., the single cache performance values as well as the aggregated cache performances) may likewise be a positive measure of performance (e.g., a cache hit rate comprising the ratio of the number of cache hits to the total number of accesses) or a negative measure of performance (e.g., a cache miss rate comprising the ratio of the number of cache misses to the total number of accesses).

According to an embodiment, the cache performance value is descriptive of a cache level greater than level one. As a processor may access a level-1 cache ("L1 cache") more frequently than higher cache levels, the recording of the cache performance values or the raw data from which they are derived may interfere with the timing of accesses for performing the test multiplications, and may thus distort the cache performance values by delaying the accesses to be observed. Hence, monitoring the cache performance of a level-2 cache ("L2 cache") or higher may result in a smaller impact of monitoring the cache performance on the calculation. However, as the number of accesses may decrease further with increasing cache level, cache hits or misses may be observed more rarely on high cache levels and may thus form less significant metrics of cache performance. A preferred compromise may be the determining cache performance values from L2 cache observations.

According to an embodiment, the aggregated cache performance comprises the sum or an average of the cache performance values, which may allow for (re-)assessing the cache performance in a single figure with a low computational effort. The sum of cache performance values may be an especially efficient means for aggregating the single cache performance values obtained for a given segment from its multiplications with the one or more test vectors. As the number of test multiplications should be the same for all segments, the sum may be considered as an equivalent means compared to the arithmetic mean of the cache performance values. However, various other choices of mean metrics such as the median, the geometric mean or the harmonic mean may be made to implement a different weighing of outliers.

According to an embodiment, the selected segments comprise a segment with a largest aggregated cache performance and a segment with a smallest aggregated cache performance. The segment with the smallest aggregated cache performance may have the greatest potential for achieving an increase of cache performance by the element swap, while the elements within the segment with the greatest aggregated cache performance may be grouped "too well" in comparison to the other segments. Hence, the segment with the highest aggregated cache performance may have the greatest potential for increasing the cache performance of the segment with the lowest aggregated cache performance. This may reduce the number of element swaps to equilibrate the aggregated cache performances of the segments and may thus make more efficient use of computing resources for the optimization of the matrix.

The designations of a largest and a smallest aggregated cache performance may relate to the aggregated cache performance distribution as measured, i.e., with no regard to any aggregated cache performance updates that may have been performed so far. Alternatively, the designations of a largest and a smallest aggregated cache performance may relate to the updated aggregated cache performances if other element swaps have been performed in the optimization cycle before.

In the latter case, the first element swap may comprise selecting the segments having the largest and smallest aggregated cache performances as measured, the next element swap may comprise selecting the segments having the second largest and the second smallest aggregated cache performance as measured, etc. A given segment does not necessarily have to reach the predefined tolerance interval by means of a single element swap. For example, the given segment may rather occur that the aggregated cache performance of a segment for which the smallest aggregated cache performance was measured is slightly increased by the first element swap with the segment for which the largest aggregated cache performance was measured, and at a later point in time, the improved segment may be selected again for a later element swap within the same optimization cycle because its updated aggregated cache performance compares to that of another segment with a smaller measured or updated aggregated cache performance than that with the largest measured aggregated cache performance.

According to an embodiment, the number of interchanged pairs of elements is less than or equal to half of the number of elements within each of the selected segments, which may provide an upper limit for the number of elements to be swapped and may therefore further improve the computational efficiency of the method. If one or more, but less than half of the elements are interchanged between segments having an equal number of elements but different average cache performances, then the difference between the average cache performances may become smaller with each additional interchanged pair, but if more than half the number of elements is interchanged, the difference may become larger again. Therefore, interchanging more than half of the elements of a segment may be unfeasible within a single element swap. However, it may be possible that a segment for which half of its elements was interchanged during a given element swap may still have a significant difference in aggregated cache performance compared to another segment such that further elements from the other half of that segment may be interchanged with the other segment during a later element swap within the same optimization cycle.

According to an embodiment, at least one of the selected segments and the number of pairs of elements to be interchanged is chosen randomly. A random selection of the pair of segments for swapping elements may facilitate interchanges of element pairs between segments that would probably not have been selected according to systematic criteria. Also, a random number of element pairs to be interchanged may reduce the probability of unintentional systematic grouping of elements within one segment. Both criteria may thus improve the decorrelation of elements that are not supposed to be grouped together in the same segment. As random choices may slow down the convergence of the optimization, embodiments of the present invention recognize the benefits of combining random choices in one iteration with systematic choices in a subsequent iteration.

According to an embodiment, the segments have an equal number of elements with a tolerance of one element, which may equalize the workload of the processor(s) between the different segments. Hence, the number of cache accesses may be similar for each segment and the comparability of the aggregated cache performances may improve.

According to an embodiment, the method further comprises ordering the logical segments by respective aggregated cache performance before the equaling of the aggregated cache performances. The ordering may reduce the effort for comparing the aggregated cache performances of the segments when selecting a pair of segments for swapping based on the aggregated cache performances. The effort for comparing unsorted segments may become significant if the number of segments is large, so this may be another possibility for using computational resources for the optimization more efficiently. Optionally, the ordering of the segments by their aggregated cache performance may be repeated before each element swap within the same iteration, such that the effect of the aggregated cache performance update may be taken into account during the selection of the next pair of segments between which elements are to be interchanged.

According to an embodiment, the method further comprises receiving a graph data structure and filling the matrix with a representation of the graph data structure. A graph data structure is understood herein as a general weighted graph featuring vertices that are interconnected by edges that have assigned numbers as weights. An exemplary matrix representing a graph where vertices "i" and "j" are connected by an edge of weight "w" may then comprise an element w at the coordinates (i, j). The special case of a non-weighted graph may be represented by a binary adjacency matrix or incidence matrix where an existing edge is indicated by a matrix element having the value one and a missing edge by value zero.

Graph operations are often implemented as algebraic operations which are based on the matrix-vector multiplication. Given a graph and the corresponding associated matrix form, many graph-related algorithms can be implemented as a sequence of basic linear algebra matrix operations. The sparse matrix-vector multiplication (SpMV) may be elementary for this class of algorithms and may be called many times in any such implementation. The SpMV may therefore dominate the performance of an implementation of algebraic graph algorithms.

Matrices representing a graph may be stored in memory in a highly unordered manner and may therefore be especially prone for cache misses. Hence, including representing a graph by the matrix may increase the computational efficiency of graph operations (such as vertex or edge addition or deletion, vertex merging or splitting, edge contraction, transpose graph, power of graph, etc. without limitation) on that graph by reducing the number of cache misses during the SpMV operations called by the graph algorithm. The optimized matrix may remain stored in memory between subsequent SpMV calls to avoid repeating the optimization for each call.

According to an embodiment, the matrix is given in the coordinate format or in the compressed sparse row format. The coordinate format (COO) may support a more efficient use of computational resources for modifying the matrix elements, which may be beneficial for performing the one or more element swaps and thus for the optimization more efficiently. On the other hand, the compressed sparse row format (CSR) may support a more efficient use of computational resources for accessing the cache and memory, which may be beneficial for performing the multiplications of the matrix to the test vectors and the input vector.

According to an embodiment, the method further comprises receiving the input vector after exiting the last optimization cycle. In other words, the optimization cycle (and probably corresponding iterations, too) are performed in the "off-line" state, where the computer program implementing the method is running, but not listening to incoming input vectors. When the input vector is received after completing all optimization cycles, the program may then proceed straight away with the multiplication by the optimized matrix, reducing or avoiding latency that might occur if the optimization was triggered by the receipt of the input vector or if the matrix and the input vector were received together.

According to an embodiment, the obtainment of the one or more test vectors comprises at least one of setting the coordinates of one or more of the test vectors by random and loading a set of one or more predetermined test vectors. Setting the coordinates of the test vector to random values may avoid systematic effects that may occur due to statistical imbalance of the coordinates of the test vectors that are constructed in a systematic way. On the other hand, using a predetermined set of test vectors may improve comparability of the statistics between subsequent iterations and/or applications of the method to different or changing matrices, and may thus improve the reproducibility of the cache performance optimization.

According to an embodiment, the method further comprises receiving a set of multiple process vectors and identifying one of the process vectors as the input vector, the obtainment of the one or more test vectors comprising identifying one or more of the other process vectors as the one or more test vectors. Accordingly, embodiments of the present invention can reduce the workload for multiplying the remaining process vectors in excess of the test multiplications that are performed during the optimization. That is, the multiplication of the whole set of process vectors may be already finished when the optimization of the matrix is completed. Let P denote the number of process vectors in the set, then it may be possible to use not all of the P−1 remaining process vectors for the test multiplications so that more than one process vector may profit from the cache performance optimization that may be achieved using the other process vectors as the test vectors.

In addition, embodiments of the present invention can then perform the test multiplications under more realistic conditions. For instance, random or predefined test vectors may contain too many or too little zeros compared to the set of process vectors to be actually multiplied, which can yield a more effective improvement of the cache performance (i.e., a further reduction of the number of cache misses when multiplying the matrix to the input vector).

According to an embodiment, the method further comprises repeating the optimization cycle if an iteration criterion is fulfilled, the iteration criterion being checked after at least one of the determination of the aggregated cache performance for each segment, and the update of the aggregated cache performance for each segment, the iteration criterion comprising a logical expression relating to at least one of the aggregated cache performance of one or more of the segments, and a number of passed iterations. The number of test vectors to be used for the cache performance test during each iteration being less than or equal to (P−1)/M, where P is the total number of process vectors and M is a predetermined maximum number of iterations.

Accordingly, embodiments of the present invention can provide that the desired multiplication of all process vectors is performed with cache performance optimization in a single processing step. Embodiments of the present invention can subdivide the set of processing vectors into test vector batches that are multiplied with the segments of the respectively preceding step of optimization (where the original matrix that has not been rearranged can be thought of as the zeroth optimization step). Hence, embodiments of the present invention can multiply every batch of test vectors with a partially reduced number of cache misses. The "learning optimization" approach may make even more efficient use of computational resources and may be resumed with any additional set of process vectors that may be received subsequently.

According to an embodiment, the number of segments comprises a logarithm to base "b" or a root of degree "n" of the total number of elements of the matrix, wherein b and n are predetermined real numbers larger than one. This use of the logarithm may allow for efficiently determining the number of segments in a single step, without the need for gathering further information and in a manner that may automatically adapt to the workload caused by the number of nonzero elements. Examples include, without limitation, the square root (n=2) and the natural logarithm (ln; b=e=2.7182818 . . . ). As the results of nth root and logarithm functions may be non-integer numbers, the determination of the number of segments in this way may also include a to-integer conversion such as rounding or truncating the result.

Now turning to the drawings, FIG. 1 depicts a flow diagram that summarizes an exemplary method, program 150, for performing a multiplication of a matrix with an input vector on a high level, in accordance with various embodiments of the present invention. It is understood that the specific order of the steps 100 to 112 of program 150 shown in FIG. 1 was merely selected for the sole purpose of illustration. That is, wherever possible, one or more of the steps 100 to 112 may likewise be performed at a different position or time of the process flow.

In further embodiments, computer system 10 (depicted in FIG. 6) can perform the functions and operations of program 150, as depicted and described with reference to FIG. 1. In other embodiments, program 150 can execute across a plurality of computing devices (not shown).

The flow diagram of program 150 starts with a step 100 that comprises subdividing a matrix given in sparse-matrix format into logical segments. The matrix is given in a sparse-matrix data format such as the coordinate format (COO) or the compressed sparse row format (CSR), which is generally not related to the sparsity of the matrix in the mathematical sense (i.e., the portion of zero matrix elements as a fraction of the total number of matrix elements). In an example embodiment, program 150 loads the matrix into a general memory region (which may be non-contiguous) and apply the segmentation. If the matrix is representative of a graph data structure, then step 100 can also include converting the graph to the sparse-matrix format.

The number of segments may be set according to various approaches, including, but not limited to, a constant number of segments, a constant number of matrix elements per segment, and a function (such as the square root or the logarithm to base 2, without limitation) of the number of elements stored in the sparse-matrix data format. The number of segments may also take into account properties of the available processor introspection capabilities, such as the number and type of available counters.

In FIG. 1 (program 150), step 100 is followed by step 102 which comprises obtaining one or more test vectors. In an example embodiment, each test vector is dimensioned such that the respective test vector can be validly multiplied with the matrix. The coordinates of the test vector may be obtained according to various approaches. For instance, some or all of the test vector coordinates may be set to a random value. Alternatively, the test vectors may be loaded from a predetermined test vector repository. If the input vector is received together with multiple further process vectors to be multiplied with the matrix, then some or all of the process vectors may be used as the test vectors.

The method of program 150 in FIG. 1 proceeds with step 104, which comprises performing multiple test multiplications, where each test multiplication comprises multiplying a given segment with a given test vector and determining a cache performance value for each test multiplication. Embodiments of the present invention can run the test multiplications over all segments and all test vectors, such that each test vector is multiplied once to each segment of the matrix. As each segment comprises an incomplete subset of the nonzero matrix elements, the algorithm performing the test calculations leaves the calculations of the coordinates of the result vector w=M v open until all elementary multiplications of elements within the various segments and their corresponding input vector coordinates are completed.

In various embodiments, the determination of cache performance values may depend on the processor introspection capabilities of the computing system where the method is executed (e.g., computer system 10). Non-exhaustive examples of metrics that may be monitored for determining the cache performance values include a miss count of the cache, a hit count of the cache, an access count of the cache, and a time taken for performing the multiplication of the segment. Actual values of such metrics may be taken as the cache performance values, or the cache performance values may be quantities derived from the actual values. For example, the cache hit ratio (being defined as the ratio of the number of successful cache accesses ("cache hits") that was recorded during the test multiplication of a single segment to a given test vector to the total number of attempted cache accesses during that time period). In an additional embodiment, program 150 can store the cache performance values for each combination of a segment and a test vector in a statistics dataset. In a non-exhaustive example, using an array for each monitored counter where the value counter metric relating to each test multiplication is stored.

The method of program 150 in FIG. 1 continues with determining an aggregated cache performance for each segment, where each segment's aggregated cache performance summarizes the cache performance values obtained from all test multiplications of that segment in a single value (step 106). Without limitation, the aggregated cache performance may be the sum over the segment's recorded cache performance values, or an average function of the segment's recorded cache performance values.

In FIG. 1 (program 150), step 106 is followed by step 108, which comprises assigning each segment's aggregated cache performance as a weight to each element within that segment. At this point, program 150 has assigned all elements within the same segment the same weight.

The method of program 150 in FIG. 1 proceeds with step 110, which comprises swapping elements between segments and updating the aggregated cache performances based on the weights (i.e., performing one or more element swaps). Each element swap can include selecting two segments for swapping, interchanging one or more pairs of elements between the selected segments, and updating the aggregated cache performances of each selected segments based on the weights of the elements that are within that selected segment after the one or more interchange operations. Various embodiments of the present invention can perform the interchange of elements between two selected segments such that the (absolute value of the) difference between their updated aggregated cache performances is reduced. In further embodiments, the element swap may be repeated until the aggregated cache performances of all segments are equal within a predefined tolerance interval.

The selection of two segments for swapping may be based, but not necessarily, on the aggregated cache performances that were determined for the segments in step 106. In a non-limiting example, the pair of segments having the greatest difference of aggregated cache performances may be selected, which may maximize the probability of grouping elements together which have a highly correlated access. In another example, the two segments are selected randomly, which may yield an improved decorrelation of elements which have a comparably uncorrelated cache access. The selection of segments for swapping based on the aggregated cache performances may be simplified by ordering the segments by aggregated cache performance.

The number of element pairs selected for interchange during a single element swap may be selected according to various approaches, including, but not limited to, a random number, a number according to an element redistribution plan based on the aggregated cache performances, a number determined based on the difference of aggregated cache performances between the selected segments, and a constant number. The number of elements included in an interchange within a single element swap should not be greater than half the number of elements for each selected segments, as an interchange of so large a number may be unsuitable for reducing the updated aggregated cache performance below the value achieved by interchanging half of the elements.

Further embodiments of the present invention can update the aggregated cache performance of each of the two selected segments by aggregating the weights of the elements that are within the given selected segment after the element swap. Once more, embodiments of the present invention can perform the aggregation, without limitation, by calculating the sum or the result of an average function of the weights.

Steps 104, 106, 108 and 110 together can be referred to as the optimization cycle of the method of program 150. Embodiments of the present invention can repeat the optimization cycle if an iteration criterion is met. Additionally, embodiments of the present invention can exit the optimization cycle if a break criterion is met. The break criterion and/or the iteration criterion may be formulated based on the aggregated cache performances and/or the updated aggregated cache performances. The iteration criterion may additionally or alternatively be formulated based on a number of iterations passed so far. The break criterion may allow for skipping steps 108 and 110 (e.g., if a reassignment of matrix elements can be considered unnecessary). In an example embodiment, the break criterion can indicate to skip step 108 and step 110 if the aggregated cache performances as measured are already within the predefined tolerance interval, or if the smallest aggregated cache performance exceeds a threshold value.

The method of program 150 ends by step 112, which includes multiplying each segment with an input vector. For example, program 150 multiplying the matrix with the input vector, where the multiplication is performed segment by segment and wherein elements of each segment that were subject to element swapping are reassigned compared to the original segmentation of the matrix.

In general, the result of the method of program 150, namely the reassignment of elements between the multiple logical segments (without changing the elements of the matrix in any way) such that the updated aggregated cache performance distribution is equalized, may be specific to the executing machine because every combination of processor(s), memory, control circuitry and operating system may yield a unique behavior of the processor cache during matrix-vector multiplications performed on that specific machine. Hence, the multiplication of the input vector to the matrix should be performed on the same machine on which the optimization cycle is performed (e.g., computer system 10). The method may yield the advantage that the number of cache misses encountered during the entire matrix-vector multiplication of the matrix with the input vector may be reduced.

Figure 2:
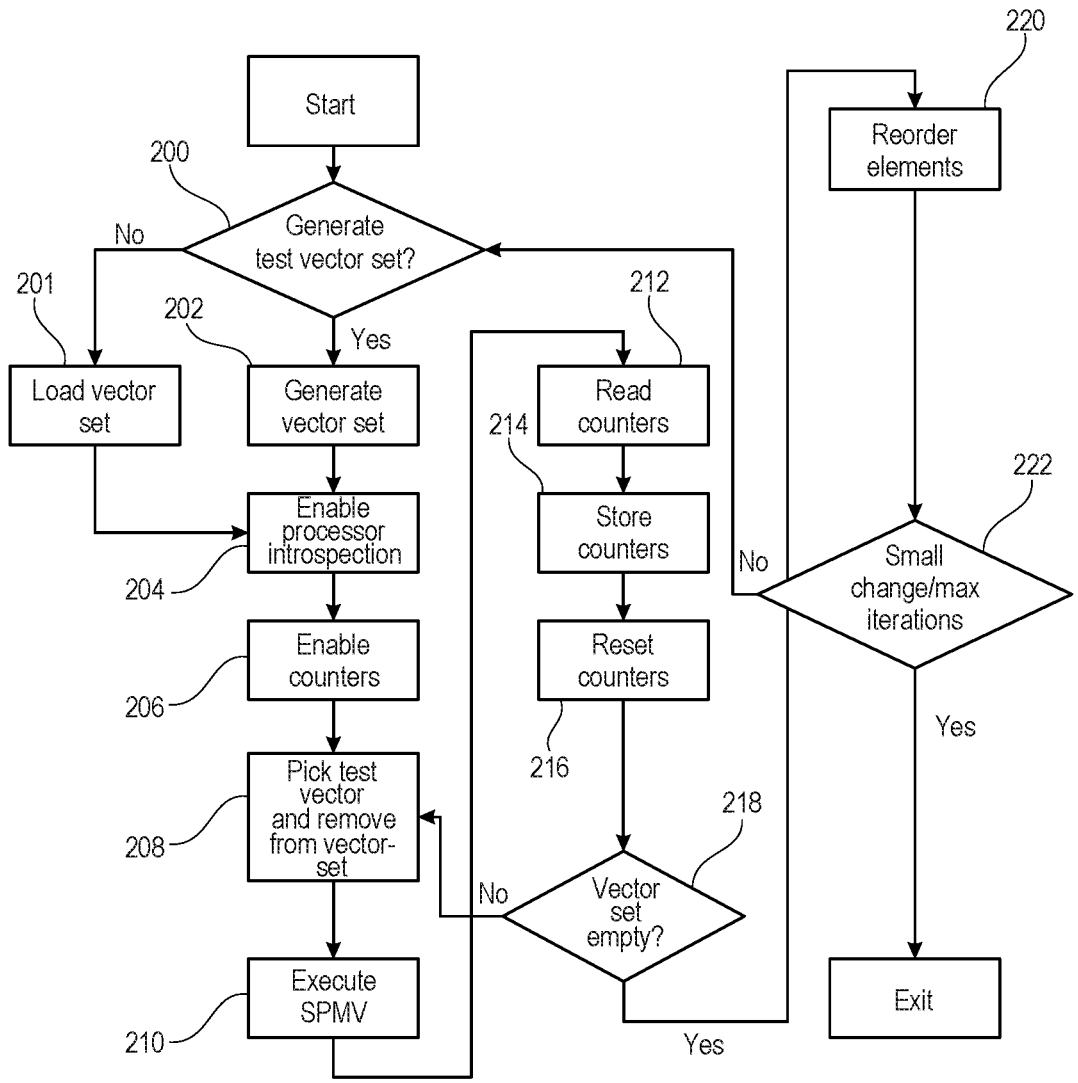
FIG. 2 depicts a flow diagram representing an implementation of an optimization cycle in a computing environment with multiple processors, in accordance with an embodiment of the present invention.

FIG. 2 depicts a flow diagram representing an exemplary implementation of the optimization cycle in a computing system (e.g., computer system 10) with multiple processors. Again, alternative implementations may be possible where one or more of the depicted steps are missing, additional steps are inserted, and/or the depicted steps are performed in an order that deviates from the specific order shown in FIG. 2.

In further embodiments, computer system 10 (depicted in FIG. 6) can perform the functions and operations of program 250, as depicted and described with reference to FIG. 2. In other embodiments, program 250 can execute across a plurality of computing devices (not shown).

At the start of the optimization cycle of program 250 (FIG. 2), a sparse-matrix representation of the matrix has been loaded into a memory of the computing system (e.g., computer system 10). The optimization cycle of program 250 starts with decision step 200, which includes determining whether to generate a set of test vectors. If a set of test vectors is available (decision step 200, NO branch), then program 250 continues in step 201 by loading the available set of test vectors into the memory of the computing system (e.g., computer system 10). In response to determining that a set of test vectors is missing or incomplete (decision step 100, YES branch), program 250 continues by generating or completing the set of test vectors (step 202), as described herein.

In program 250, steps 201 and 202 are followed by step 204, which comprises enabling an introspection mechanism on the processor(s) that may participate in the test multiplications (discussed in further detail with regard to step 210). Program 250 can enable processor introspection using a means such as an API command that may be provided by the operating system running on computing system 10. In one embodiment, enabling processor introspection may require loading a specific kernel module and obtaining elevated privileges for accessing processor introspection counters.

The optimization cycle of program 250 (FIG. 2) continues in step 206 by enabling counters (for instance, the L2 cache hit ratio) as needed for recording memory/cache access patterns for each segment of the matrix. In an example embodiment, the plural form "counters" indicates the potential presence of multiple processors, multiple caches of the same level, and/or multiple cache levels available for monitoring. Enabling the counters can also comprise initializing the counters as necessary.

In program 250, step 206 is followed by step 208, which comprises selecting a test vector from the set of test vectors and removing the selected test vector from the set. Program 250 follows step 206 with step 210, which includes a test multiplication (i.e., a matrix-vector multiplication of the matrix by the selected test vector). According to program 250 in FIG. 2, after completion of the test multiplication of step 210 for one of the segments (e.g., SpMV), program 250 reads out the counters (in step 212) indicating the cache performance during the test multiplication (of step 210) of that segment and program 250 stores (in step 214) the counters in a statistics array that allows to trace the identity of the segment for which the respective counter value was recorded at a later time.

In FIG. 2, once program 250 has read out the counters (in step 212) for a given segment, program 250 can reset the counters (in step 216). Further, program 250 can then repeat and steps 210, 212, 214 and 216 (notwithstanding parallel execution of the multiplication algorithm on multiple processors or processing cores) for the following segments until all segments of the matrix have been multiplied (in step 210) to the selected test vector.

The optimization cycle of FIG. 2 continues with program 250, in decision step 218, checking whether the set of test vectors is empty. If program 250 determines that the set is not empty (decision step 218, NO branch), then the optimization cycle of program 250 continues with picking and removing the next test vector from the set (step 208).

In response to determining that the set of test vectors is empty (decision step 218, YES branch), the optimization cycle of program 250 continues with reordering the elements between the segments (step 220). In an example embodiment, reordering (in step 220) includes at least determining an aggregated cache performance for each segment from the recorded cache performance values (here, the counter values) (step 106 of program 150), assigning each segment's aggregated cache performance as a weight to respective elements (step 108 of program 150), and swapping pairs of elements between selected segments and updating the aggregated cache performances of the selected segments until the updated aggregated cache performances are equal within a predetermined tolerance interval (step 110 of program 150).

In another example, program 250 can perform the reordering of step 220 before checking whether the vector set is empty (in step 218). For example, program 250 can obtain the test vectors as a subset of a larger set of process vectors to be multiplied by the matrix and perform the multiplication of each subset by performing the optimization cycle using the given subset as the set of test vectors.

The optimization cycle of program 250 then checks an iteration criterion (decision step 222). In an example embodiment, checking the iteration criterion includes checking whether a predetermined maximum number of iterations has been reached, or whether a change measure of the updated aggregated cache performances is smaller than a predetermined change threshold criterion. In further embodiments, the determination of the change measure may comprise, without limitation, aggregating the updated aggregated cache performances over the segments to an AU value or comparing the updated aggregated cache performances for each segment, and calculating the difference(s) of the AU/the updated aggregated cache performances to the respective value(s) of a preceding iteration or to the measured aggregated cache performances of the current iteration (as determined in steps 210 through 216).

If program 250 determines that the iteration criterion is fulfilled (e.g., the maximum number of iterations has not been reached and the change measure is above the change threshold) (decision step 222, NO branch), then the optimization cycle of program 250 (FIG. 2) starts the next iteration of the optimization cycle by continuing with step 200. In various embodiments, invoking a further iteration of the optimization cycle may yield improved (updated) aggregated cache performances (i.e., increased aggregated cache performances if the available performance metrics are positive, and decreased aggregated cache performances if the available performance metrics are negative) for one or more of the updated aggregated cache performances in the next iteration.

In response to determining that the iteration criterion is not fulfilled (e.g., the maximum number of iterations has been reached or the change measure is less than or equal to the change threshold) (decision step 222, YES branch), the optimization cycle of program 250 breaks (e.g. by submitting a signal of being ready for receiving the input vector, or by performing the multiplying of step 112 the matrix using the updated segments with the input vector if the input vector has already been received at that point). For that purpose, the final assignment of the elements to the segments according to the last element swap of the last optimization cycle is kept and used throughout the lifetime of program 250 or until a user request is issued to repeat the optimization or start a new optimization for a new or changed matrix.

Figures 3A, 3B, 3C:
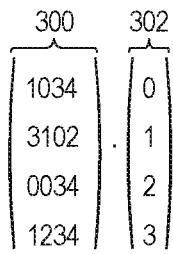
FIG. 3A depicts an exemplary matrix-vector multiplication, in accordance with an embodiment of the present invention.
FIG. 3B depicts a representation of the matrix of FIG. 3A in coordinate format, in accordance with an embodiment of the present invention.
FIG. 3C illustrates possible cache states that can be realized during the multiplication of FIG. 3A on an exemplary computing system, in accordance with an embodiment of the present invention.

FIGS. 3A, 3B, and 3C and 4 exhibit a strongly simplified example of a matrix optimization according to an example embodiment of the present invention. FIG. 3A depicts a formula defining an exemplary matrix-vector multiplication of a 4×4 matrix 300 with a test vector 302. From left to right, the matrix 300 comprises the columns [0]=[1, 3, 0, 1] (elements ordered by ascending line number [0] to [3], which corresponds to the downward direction in FIG. 3A), [1]=[0, 1, 0, 2], [2]=[3, 0, 3, 3], and [3]=[4, 2, 4, 4]. In the same order, the coordinates of the test vector 302 read [0, 1, 2, 3].

FIG. 3B depicts a representation of the matrix of FIG. 3A in coordinate format. Only the nonzero elements of the matrix 300 are stored in the representation. The coordinate representation comprises a line index array I, a column index array J, and an element value array S, respectively reading I=[0, 0, 0, 1, 1, 1, 2, 2, 3, 3, 3, 3], J=[0, 2, 3, 1, 3, 0, 2, 3, 0, 1, 2, 3], and S=[1, 3, 4, 1, 2, 3, 3, 4, 1, 2, 3, 4].

In order to demonstrate principles of the present disclosure with an easily comprehensible example, the computing system (e.g., computer system 10) is assumed to provide a processor cache that is restricted to storing merely three coordinates of the test vector 302 at the same time. Similar restrictions that may apply to the contents of the matrix 300 are ignored for demonstration purposes.

In that sense, FIG. 3C illustrates the two only possible cache states, namely [0, 1, 2] and [1, 2, 3], that can be realized during the multiplication of FIG. 3A using the coordinate representation of FIG. 3B on the exemplary computing system. It is further assumed that the multiplication of each segment, as defined below, starts with the cache having been initialized to the [0, 1, 2] state. The optimization goal in the example is to obtain an average aggregated cache performance of at least 0.75, which is implemented as a break criterion as well as an iteration criterion for the optimization cycle.

FIG. 4 illustrates effects of optimization cycle operations carried out on the matrix representation of FIG. 3B. First, the arrays I, J and S are divided into three segments A, B, C of four elements, each in the order given above. A first multiplication test is performed which is represented by the data given in block 402 and its results are given in block 400. The elementary multiplications of the elements are performed in the given order. Each element that is not found in the cache is framed in block 402. In the following, single elements are referred to by the respective sequential position within the segment to which is assigned, as shown in left-to-right order in FIG. 4. For instance, the second element of segment C is [I, J, S]=[3, 1, 2] and is denoted C.2. In addition, the column coordinates J are highlighted in bold face to simplify the association of the elements with the coordinates of the test vector 302 by which they are to be multiplied.

The test multiplication of segment A starts with cache state [0, 1, 2]. The coordinates for multiplying elements A.1 and A.2 are found in the cache (J=0 and 2, respectively). However, the coordinate for multiplying element A.3 is not found in the cache (J=3, but the cache still holds [0, 1, 2]). Hence, the cache must be reloaded from memory with [1, 2, 3]. The coordinate for multiplying element A.4 is found again (J=1). In summary, four cache accesses were performed, of which three accesses were successful (cache hits) and one was unsuccessful (cache miss). This corresponds to a cache hit ratio of 0.75, which is shown in the "A" line of block 400 as well as the aggregated cache performance summary block 412 of block 402. The "A" line of block 400 also shows the sequence {[0, 1, 2], [1, 2, 3]} of cache states assumed during the test multiplication of segment A.

Similarly, the test multiplication is performed for segments B and C. A's can be seen from blocks 400 and 402 again, segment B produced three cache misses (framed elements B.1, B.2, and B.4), i.e., the cache had to be reloaded three times, and the corresponding cache hit ratio is 0.25. Segment C yielded a hit ratio of 0.75, with element C.4 producing a cache miss.

As the set of test vectors in this example contains only one element, the aggregated cache performance for each segment is identical to the respective measured cache hit ratio. The arithmetic average over the three aggregated cache performances thus obtained is about 0.58, which is below 0.75. Hence, the break criterion is not fulfilled, and the procedure continues with element swapping. Blocks 402 through 408 also show the assignment of the segments' aggregated cache performances thus measured to their respective single elements. The element swaps illustrated in blocks 404 and 406 are also highlighted by frames. The number of element swaps was determined by the rule that each segment should have interchanged at least one element, and by the tolerance interval of 0.2. The positions of the elements to be interchanged were chosen randomly.

Block 404 shows the effect of an initialization of the one or more element swap which comprised sorting the segments by aggregated cache performance in order to facilitate the subsequent element interchanges. The new order is also kept for the subsequent blocks 406 and 408 and is also reflected by the order of segments in the aggregated cache performance summary block 412. This was followed by an initialization of the first element interchange, which comprised the selection of segment A ranking highest in aggregated cache performance and segment B ranking lowest in aggregated cache performance for swapping, and randomly selecting the elements A.4 and B.1 for swapping.

The result of the first element interchange is shown in block 406, where element A.4, which formerly read [I, J, S]=[1, 1, 1], is now [1, 3, 2] and element B.1 now reads [1, 1, 1]. The updated aggregated cache performances for segments A and B are now (3×0.75+1×0.25)/4=0.625 for segment A and (3×0.25+1×0.75)/4=0.375, which is shown in the aggregated cache performance block 412 for block 406. Block 406 further shows the result of initializing the next element swap, which comprised selecting segments B and C for swapping, and randomly selecting elements C.3 and B.4 for swapping.

The result of the second element interchange is shown in block 408, where element C.3, which formerly read [3, 2, 3], is now [2, 3, 4] and element B.4 now reads [3, 2, 3]. The updated aggregated cache performances for segments A and B are now (3×0.75+1×0.25)/4=0.625 for segment A and (2×0.25+2×0.75)/4=0.5, which is shown in the aggregated cache performance block 412 for block 408. As at least one element has been interchanged from each segment, the procedure continues by checking swap loop condition (i.e., whether the difference between the largest and the smallest updated aggregated cache performance is not larger than 0.2). With an aggregated cache performance of 0.625 for segments A and C and 0.5 of segment B, said difference is found to be 0.125, which is smaller than 0.2, and thus the element swap is not continued.

The procedure then continued with checking the iteration condition whether the average updated aggregated cache performance over all segments is at least 0.75. The updated aggregated cache performances now read 0.625 for segments A and C, and 0.5 for segment B, which yields an average updated aggregated cache performance of about 0.58, which is smaller than 0.75. Hence, the optimization cycle is restarted.

The second iteration of the optimization cycle starts with test multiplications of the three segments after completion of the element swaps performed in the first optimization cycle. As can be seen by the cache sequence of the second test multiplication shown in block 410 and the frames highlighting cache misses in block 408, the test multiplications resulted in one miss in segment A, one miss in segment C, and zero misses in segment B. This corresponds to cache hit ratios of 0.75 for segments A and C and 1.0 for segment B.

Next, the procedure resumes by checking the break condition whether the average of the measured aggregated cache performances (once more identified with the segments' respective cache hot ratios) over all segments is at least 0.75. This condition is found to be true, as the measured average has now increased to about 0.83. Hence, the optimization cycle breaks (i.e., the optimization completes) and the procedure continues with listening for an input vector to be multiplied with the matrix 300 at a later time.

Figure 5:
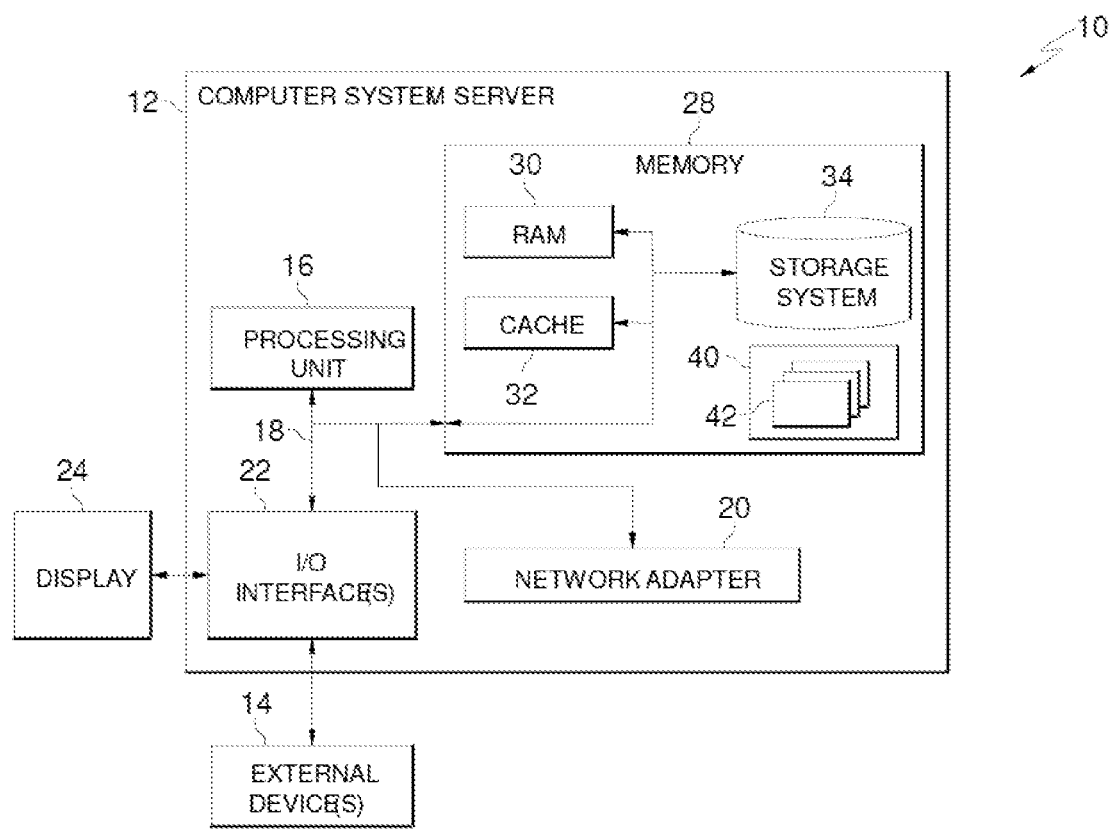
FIG. 5 is a schematic of an exemplary computing system, in accordance with an embodiment of the present invention.

Embodiments of the present invention may be implemented using a computing device that may also be referred to as a computer system, a client, or a server. Referring now to FIG. 5, a schematic of an example of a computer system is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

Computer system 10 can include a computer system/server 12, which is operational with numerous other general-purpose or special-purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computer system 10 is shown in the form of a general-purpose computing device. The components of computer system/server 12 may include, but are not limited to, one or more processors or processor 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A computer system such as the computer system 10 shown in FIG. 5 may be used for performing operations disclosed herein such as a multiplication of a matrix with an input vector. Such computer system may be a standalone computer with no network connectivity that may receive data to be processed, such as the matrix and the input vector, through a local interface. Such operation may, however, likewise be performed using a computer system that is connected to a network such as a communications network and/or a computing network.

Figure 6:
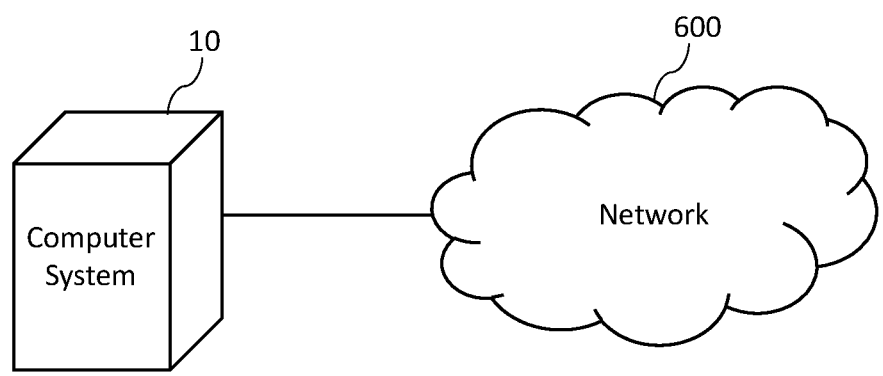
FIG. 6 schematically illustrates an exemplary computing environment, in accordance with an embodiment of the present invention.

FIG. 6 shows an exemplary computing environment where a computer system such as computer system 10 is connected, e.g., using the network adapter 20, to a network 600. Without limitation, the network 600 may be a communications network such as the internet, a local-area network (LAN), a wireless network such as a mobile communications network, and the like. The network 600 may comprise a computing network such as a cloud-computing network. The computer system 10 may receive data to be processed, such as the matrix and the input vector, from the network 600 and/or may provide a computing result, such as an optimized sparse matrix, to another computing device connected to the computer system 10 via the network 600.

The computer system 10 may perform operations described herein, entirely or in part, in response to a request received via the network 600. In particular, the computer system 10 may perform such operations in a distributed computation together with one or more further computer systems that may be connected to the computer system 10 via the network 600. For that purpose, the computing system 10 and/or any further involved computer systems may access further computing resources, such as a dedicated or shared memory, using the network 600. In various embodiments, computer system 10 (depicted in FIG. 6) can perform the functions and operations of program 150, as depicted and described with reference to FIG. 1, and program 250, as depicted and described with reference to FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented for performing a multiplication of a matrix with an input vector, the method comprising:
   subdividing, by one or more processors, a matrix into logical segments, the matrix being given in a sparse-matrix data format;
   obtaining, by one or more processors, one or more test vectors; and
   performing, by one or more processors, an optimization cycle further comprising:
      for each of the test vectors, performing, by one or more processors, a cache performance test, the cache performance test further comprising:
         for each of the logical segments, performing, by one or more processors, a test multiplication by providing a respective logical segment and a respective test vector to an input of a matrix-vector multiplication algorithm, and
         during the test multiplication of each segment, determining, by one or more processors, a cache performance value of a cache of a processor performing the test multiplication.

2. The method of claim 1, wherein the optimization cycle further comprises, for each of the logical segments:
   determining, by one or more processors, an aggregated cache performance from the cache performance values determined for the respective logical segment; and
   assigning, by one or more processors, a weight to each element of the matrix within the respective logical segment, the weight comprising the aggregated cache performance of the logical segment.

3. The method of claim 2, wherein the optimization cycle further comprises:
   performing, by one or more processors, one or more instances of an element swap until the aggregated cache performances of the logical segments are equal within a predefined tolerance interval, the element swap comprising:
      selecting, by one or more processors, two of the logical segments for swapping;
      interchanging, by one or more processors, one or more pairs of elements between the selected logical segments, the interchange being performed such that a difference between the aggregated cache performances of the selected logical segments, when calculated for each selected segment after the interchange based on the weights of the elements within the segment, has a smaller absolute value than the difference between the aggregated cache performances of the selected segments before the interchange, and
      after the interchange, updating, by one or more processors, the aggregated cache performance of each selected segment based on the weights of the elements within the segment.

4. The method of claim 3, further comprising:
   after exiting the optimization cycle, for each of the segments, performing, by one or more processors, the multiplication by providing the segment and the input vector to the input of the matrix-vector multiplication algorithm.

5. The method of claim 3, wherein the assignment of the weight to each element of the matrix and the element swap being performed in response to determining that an optimization criterion is not fulfilled, the optimization criterion comprising a logical expression relating to the aggregated cache performance of at least one of the segments.

6. The method of claim 3, further comprising:
   in response to determining that an iteration criterion is fulfilled, repeating, by one or more processors, the optimization cycle, the iteration criterion being checked after at least one of the determination of the aggregated cache performance for each segment, and the update of the aggregated cache performance for each segment, wherein the iteration criterion comprises a logical expression relating to at least one of the aggregated cache performance of one or more of the segments, and a number of passed iterations.

7. The method of claim 1, wherein the cache performance value is derived from one or more of information selected from the group consisting of: a miss count of the cache, a hit count of the cache, an access count of the cache, and a time taken for performing the multiplication of the segment.

8. The method of claim 1, wherein the cache performance value is descriptive of a cache level greater than level one.

9. The method of claim 1, wherein the aggregated cache performance includes one of: a sum of the cache performance values, or an average of the cache performance values.

10. The method of claim 3, wherein the selected logical segments include a segment with a largest aggregated cache performance and a segment with a smallest aggregated cache performance.

11. The method of claim 3, wherein the number of interchanged pairs of elements is less than or equal to half the number of elements within each of the selected logical segments.

12. The method of claim 3, wherein at least one of the selected logical segments and the number of pairs of elements to be interchanged are chosen randomly.

13. The method of claim 3, further comprising:
ordering, by one or more processors, the logical segments by respective aggregated cache performance before equaling the aggregated cache performances.

14. The method of claim 1, further comprising:
receiving, by one or more processors, a graph data structure and filling the matrix with a representation of the graph data structure.

15. The method of claim 1, wherein the matrix is given in a format selected from the group consisting of coordinate format and compressed sparse row format.

16. The method of claim 1, wherein obtaining the one or more test vectors further comprises one of:
setting coordinates of one or more of the test vectors by random and loading a set of one or more predetermined test vectors.

17. The method of claim 1, further comprising:
receiving, by one or more processors, a set of multiple process vectors; and
identifying, by one or more processors, one of the process vectors as the input vector, wherein obtaining the one or more test vectors comprises identifying one or more of other process vectors as the one or more test vectors.

18. A computer program product for performing a multiplication of a matrix with an input vector, the computer program product comprising:
one or more computer readable storage media and program instructions stored on the one or more computer readable storage media, the program instructions comprising:

program instructions to subdivide a matrix into logical segments, the matrix being given in a sparse-matrix data format;
program instructions to obtain one or more test vectors; and
program instructions to perform an optimization cycle further comprising:
for each of the test vectors, program instructions to perform a cache performance test, the cache performance test further comprising:
for each of the logical segments, program instructions to perform a test multiplication by providing a respective logical segment and a respective test vector to an input of a matrix-vector multiplication algorithm, and
during the test multiplication of each segment, program instructions to determine a cache performance value of a cache of a processor performing the test multiplication.

19. A computer system performing a multiplication of a matrix with an input vector, the computer system comprising:
one or more computer processors;
one or more computer readable storage media; and
program instructions stored on the computer readable storage media for execution by at least one of the one or more processors, the program instructions comprising:
program instructions to subdivide a matrix into logical segments, the matrix being given in a sparse-matrix data format;
program instructions to obtain one or more test vectors; and
program instructions to perform an optimization cycle further comprising:
for each of the test vectors, program instructions to perform a cache performance test, the cache performance test further comprising:
for each of the logical segments, program instructions to perform a test multiplication by providing a respective logical segment and a respective test vector to an input of a matrix-vector multiplication algorithm, and
during the test multiplication of each segment, program instructions to determine a cache performance value of a cache of a processor performing the test multiplication.

20. The computer system of claim 19, wherein the optimization cycle further comprises program instructions, for each of the logical segments, to:
determine an aggregated cache performance from the cache performance values determined for the respective logical segment; and
assign a weight to each element of the matrix within the respective logical segment, the weight comprising the aggregated cache performance of the logical segment.

* * * * *